(12) United States Patent
Pitcavage

(10) Patent No.: US 10,274,072 B2
(45) Date of Patent: Apr. 30, 2019

(54) INTEGRATED WHEEL END COUPLER

(71) Applicant: RB Distribution, Inc., Colmar, PA (US)

(72) Inventor: Brian Richard Pitcavage, Oreland, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 14/818,959

(22) Filed: Aug. 5, 2015

(65) Prior Publication Data

US 2016/0040770 A1    Feb. 11, 2016

Related U.S. Application Data

(60) Provisional application No. 62/033,504, filed on Aug. 5, 2014.

(51) Int. Cl.
| | |
|---|---|
| *F16D 1/02* | (2006.01) |
| *F16D 1/06* | (2006.01) |
| *F16D 1/10* | (2006.01) |
| *B60B 27/00* | (2006.01) |
| *F16H 57/04* | (2010.01) |

(52) U.S. Cl.
CPC ......... *F16H 57/04* (2013.01); *B60B 27/0026* (2013.01); *F16D 1/02* (2013.01); *F16D 1/06* (2013.01); *F16D 2001/103* (2013.01)

(58) Field of Classification Search
CPC .................. B60K 17/34; B60K 17/315; B60K 2023/0875
USPC ............ 180/385; 464/182; 403/359.1, 359.5; 192/69.4
See application file for complete search history.

(56) References Cited

U.S. PATENT DOCUMENTS

| | | | | |
|---|---|---|---|---|
| 2,510,414 | A | * | 6/1950 | Philbrick ................ F16D 3/848 277/563 |
| 3,117,430 | A | * | 1/1964 | Mueller .................. F16D 3/185 184/109 |
| 3,588,154 | A | * | 6/1971 | Voight, et al. ............ F16D 1/04 403/300 |

(Continued)

OTHER PUBLICATIONS

F150online forum titled "permanent fix for 4wd vacuum IWE", Mar. 17, 2010-Aug. 12, 2014, pp. 1, 3.*

(Continued)

*Primary Examiner* — Terence Boes
*Assistant Examiner* — Bobby Rushing, Jr.
(74) *Attorney, Agent, or Firm* — Volpe and Koenig, P.C.

(57) ABSTRACT

An integrated wheel end coupler for replacing an OEM coupler is disclosed. Since the current device is a replacement part for the OEM actuator, it has the same overall external dimensions and mounts in the vehicle in the same manner as a replacement OEM actuator. The coupler has a ring gear with splines dimensioned to mesh with splines on the half-shaft and hub. Preferably, the ring gear includes an internal insert positioned between the half-shaft and hub that prevents slippage off of the splines. The ring gear is located so that the splines on both the hub and the half shaft are locked together mechanically and they spin at the same rate of speed. The coupler also includes pins to receive and close off the airlines associated with the OEM actuator being replaced, and a grease fitting that allows the application of grease to the coupled parts.

12 Claims, 5 Drawing Sheets

(56) References Cited

U.S. PATENT DOCUMENTS

| | | | | | |
|---|---|---|---|---|---|
| 4,779,698 | A | * | 10/1988 | Iwata | B60K 17/35 180/247 |
| 5,740,895 | A | * | 4/1998 | Bigley | B60K 17/3515 192/69.41 |
| 6,318,492 | B1 | * | 11/2001 | Goddard | B60K 17/3515 180/247 |
| 6,318,533 | B1 | * | 11/2001 | Krisher | B60K 17/306 180/247 |
| 6,371,268 | B1 | * | 4/2002 | McMorris | F16D 11/04 192/69.41 |
| 6,598,722 | B2 | | 7/2003 | Pugliese et al. | |
| 6,883,604 | B2 | * | 4/2005 | Mack | F04D 13/10 166/105 |
| 7,143,883 | B2 | * | 12/2006 | McCalla | F16D 3/223 192/69.41 |
| 8,205,733 | B2 | * | 6/2012 | Schumacher | B60B 3/16 192/109 R |
| 8,690,690 | B2 | * | 4/2014 | Conger | F16D 1/116 464/146 |
| 8,783,995 | B2 | * | 7/2014 | Besler | F16D 1/02 403/305 |
| 8,869,962 | B2 | * | 10/2014 | Brown | F16D 1/072 192/69.4 |
| 9,091,307 | B2 | * | 7/2015 | Feusse | F16D 25/04 |
| 9,205,738 | B2 | * | 12/2015 | Clohessy | B60K 23/08 |
| 2008/0318693 | A1 | * | 12/2008 | Langer | B60K 17/22 464/162 |

OTHER PUBLICATIONS

F150online forum titled, "permanent fix for 4wd vacuum IWE", Mar. 17, 2010-Aug. 12, 2014, pp. 1,3. (Cleaner Printer Version).*
fordraptorforum.com, "Upgraded IWE", Jan. 24, 2013-Jan. 25, 2013, pp. 1-2.*
ford-trucks.com forum titled "Do I need to cap off my hub vacuum lines?", Feb. 22, 2012-Mar. 2, 2017, p. 2. (Year: 2012).*
ford-trucks.com forum titled "IWE vent has been capped???", Mar. 25, 2017-Oct. 16, 2017. (Year: 2017).*
Warn Powertrain—Warn Industries, Inc.—Integrated Wheel End Disconnect (IWE).

* cited by examiner

INTEGRATED WHEEL END COUPLER

CROSS REFERENCE TO RELATED APPLICATION

This application claims the benefit of U.S. provisional application 62/033,504, filed Aug. 5, 2014, which is incorporated by reference as if fully set forth.

FIELD OF INVENTION

The present invention relates generally to an actuator for connecting a front wheel drive shaft to the front wheel hub. In particular, the present invention relates to an actuator that connects the front wheel drive shaft to the front wheel hub in a fixed connection without requiring any replacement of the original equipment manufacturer's parts (OEM) known as an integrated wheel end coupler.

BACKGROUND

The present invention addresses a problem with an OEM actuator for connecting the front wheel drive shaft to the front wheel hub. The OEM device is movable between engaged and disengaged positions through applying and removing air pressure. The OEM device is biased toward the disengaged position.

The OEM actuator the invention replaces is mounted on the back of the steering knuckle to provide a ring gear that will couple the hub and a half shaft. The half shaft is inserted into the actuator, where its splines are fully engaged with the ring gear until it becomes activated and engaged with the splines of the hub. The OEM actuator is vacuum controlled. To engage 4WD, the vacuum is released and a spring moves the ring gear to a position where it engages both the half shaft and the hub.

A typical OEM prior arrangement is shown in U.S. Pat. No. 6,318,533. FIG. 1 illustrates an exemplary prior art front drive wheel assembly that has a steering knuckle that is includes upper and lower mounts, A and B, and a wheel D on which a tire is mounted. The wheel D is driven through a half shaft E and a hub F which are powered by the outer race G of a constant velocity joint operatively associated with the half shaft E. There are a plurality of splines, H and I, which are selectively engageable through a locking collar J. The locking collar J is controlled by applying vacuum to the assembly K and collapsing the spring L which biases the assembly toward the two wheel drive mode. This vacuum actuation in the prior art is source of failure and intermittent operation.

The OEM actuator is prone to failure of the vacuum assembly and results in unexpected, erratic, or no 4WD engagement. Experience with the prior device has revealed a tendency for the OEM actuator to engage at inopportune times. Accordingly, it is desired to have a coupler that replaces the OEM actuator, eliminates the known failure points, and secures the half shaft and the hub in a fixed constant connection that does not rely upon any subsequent operation.

SUMMARY

The disclosed coupler includes a ring gear that engages or connects the front wheel drive shaft to the front wheel hub and eliminates the need for applying a vacuum to engage the parts. In addition, the actuator includes a grease fitting that permits the application of grease to the connection points. When the splines on both the hub and the half shaft are mechanically locked together, they spin at the same rate of speed. When the vehicle is operating in 2WD, the front wheel hub and the half shaft on one side of the vehicle are connected by the coupler and allowed to travel at a rate of speed that can be different from the other side of the vehicle. When the vehicle transfer case and front differential are shifted into 4WD, the corresponding front wheel hubs and half shafts travel at the same rate of speed and allow the vehicle's power to be diverted as needed without causing any internal damage to the 4WD system.

Because the current coupler does not need a moving ring gear, a plastic or nylon ring gear carrier holds the ring gear at the appropriate engagement height to ensure the ring gear meshes with both splined components. An additional advance of this design is the ability to provide a ring gear that is approximately twice the thickness or height of the one in the OEM actuator. This wider ring gear provides space for an internal groove that receives an internal snap ring that ensures the gear cannot disengage from either of the two splined components it couples. There is a grease passage through the coupler housing that allows grease to be applied to the ring gear, splined shafts, and wheel hub bearing through a grease fitting mounted on the housing. Because the need for vacuum is eliminated, there are two solid pins that cap off the OEM vacuum lines

BRIEF DESCRIPTION OF THE DRAWING(S)

DETAILED DESCRIPTION OF THE PREFERRED EMBODIMENT(S)

Figure 1:
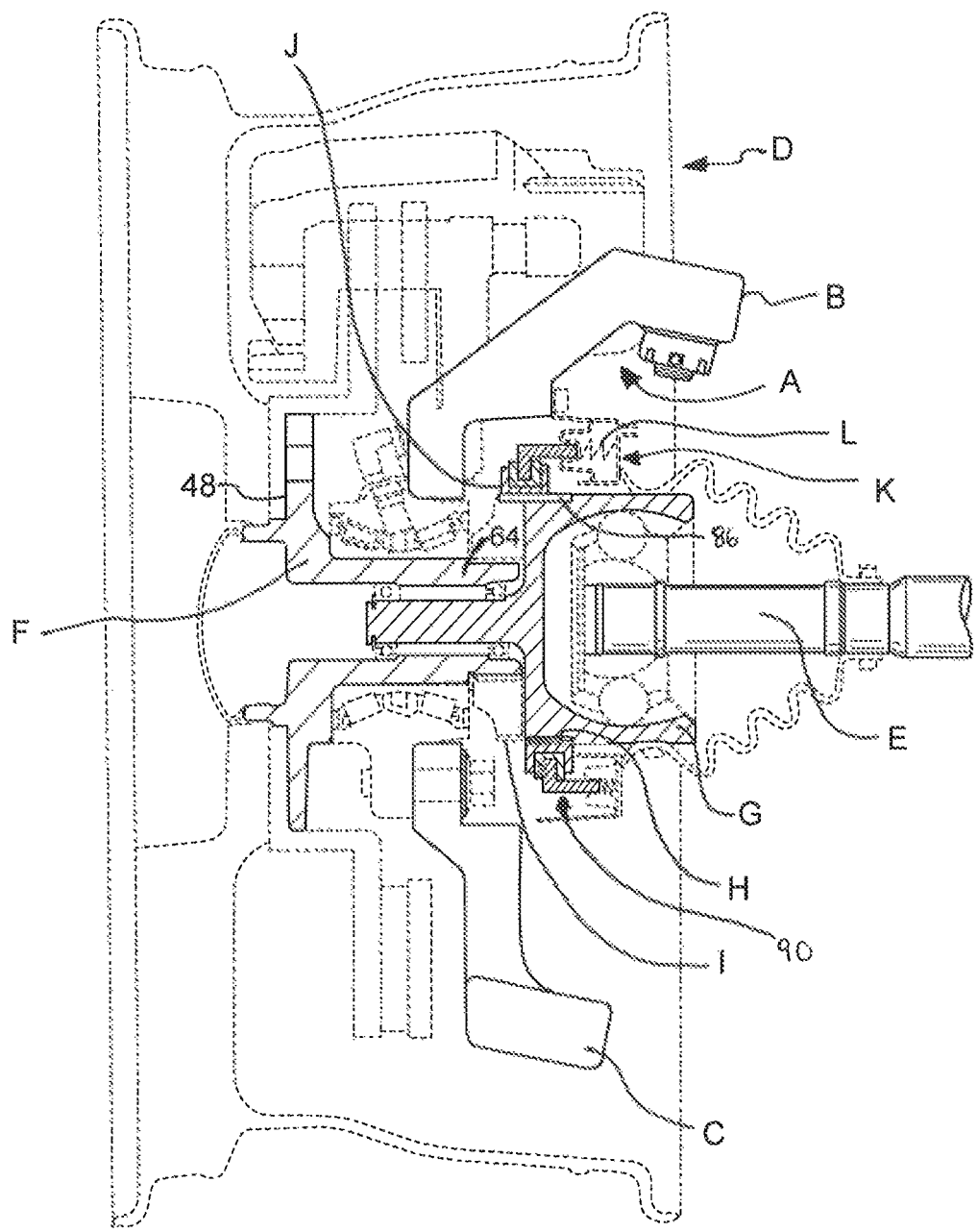
FIG. 1 is an example of a half shaft and a constant velocity joint associated with a wheel hub in a prior art vehicle.
Figure 2:
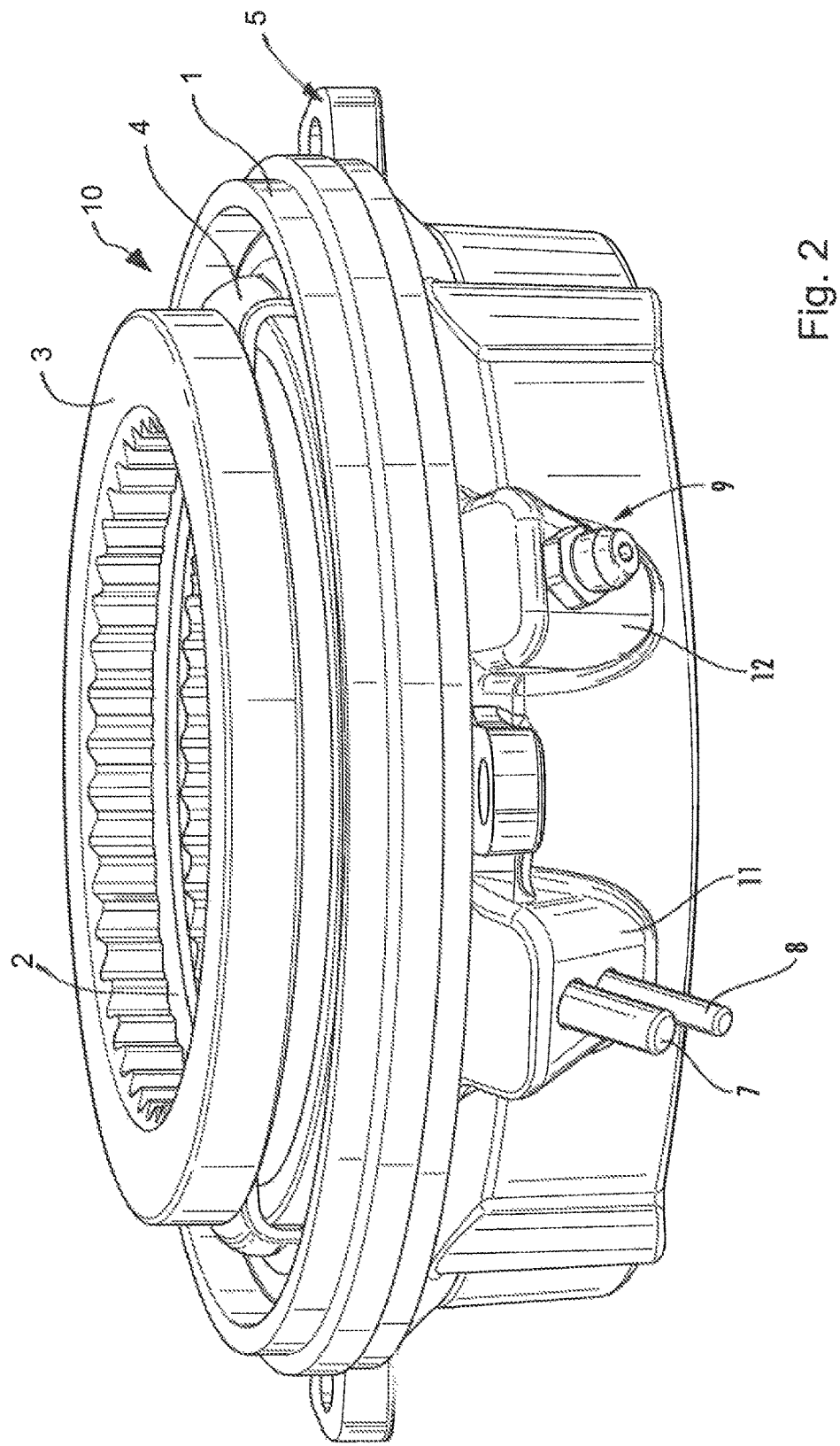
FIG. 2 is a perspective view of the coupler according to the invention for connecting a half shaft and a wheel hub.

Referring to FIG. 2, it can be seen that the assembled coupler (10) includes pins (7) and (8) in projection (11) that serve to block the airlines associated with an OEM device that was movable between engaged and disengaged positions through applying and removing a vacuum. The pins (7) and (8) are solid because their purpose is to block or close off the vacuum lines associated with the OEM device.

Figure 3:
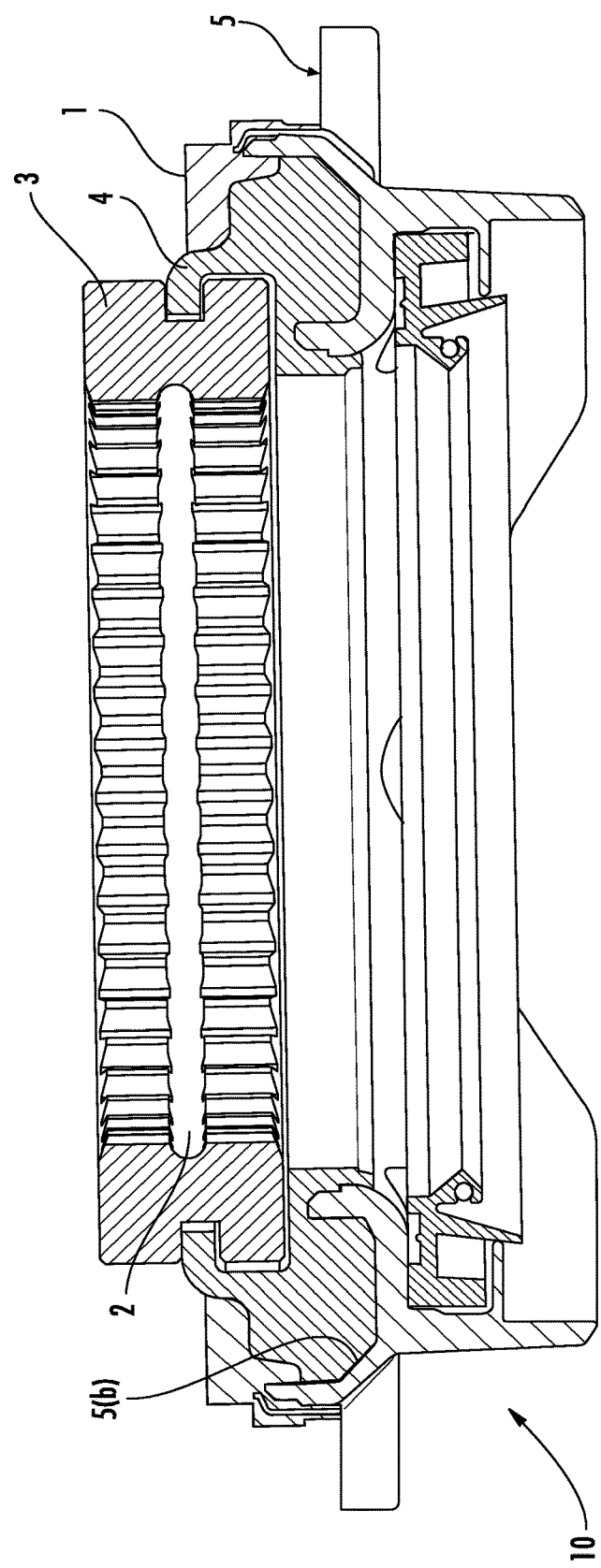
FIG. 3 is a section view of the coupler.

FIG. 3 is a section view through the device of FIG. 2 As can be seen in FIG. 3, the ring gear (3), ring gear carrier (4) and the housing (5) are fixed relative to each other. The ring gear (3) has interior splines, an exterior circumferential groove (3) (*a*), and an interior circumferential grove (3) (*b*). The ring gear carrier (4) has a side wall and a circumferential projection (4) (*a*) that forms an interior groove with the base of the ring carrier. The circumferential projection (4) (*a*) extends for less than the full circumference of the ring gear carrier (4) to provide an opening for assembling the ring gear (3) to the ring gear carrier (4). When the ring gear (3) and the ring rear carrier are assembled, the circumferential projection (4) (*a*) extends into the exterior circumferential groove (3) (*a*). A snap ring (2) is positioned partially in the interior circumferential groove (3) (*b*) of the ring gear and extends inwardly beyond the splines. The housing has an interior channel (5) (*b*) that is configured to receive the ring gear carrier (4). When assembled in a vehicle, the coupler (10) is fixed in the engaged position by the snap ring (2) with both a half-shaft and an associated hub so that they are linked mechanically and constantly spin at the same speed.

Figure 4:
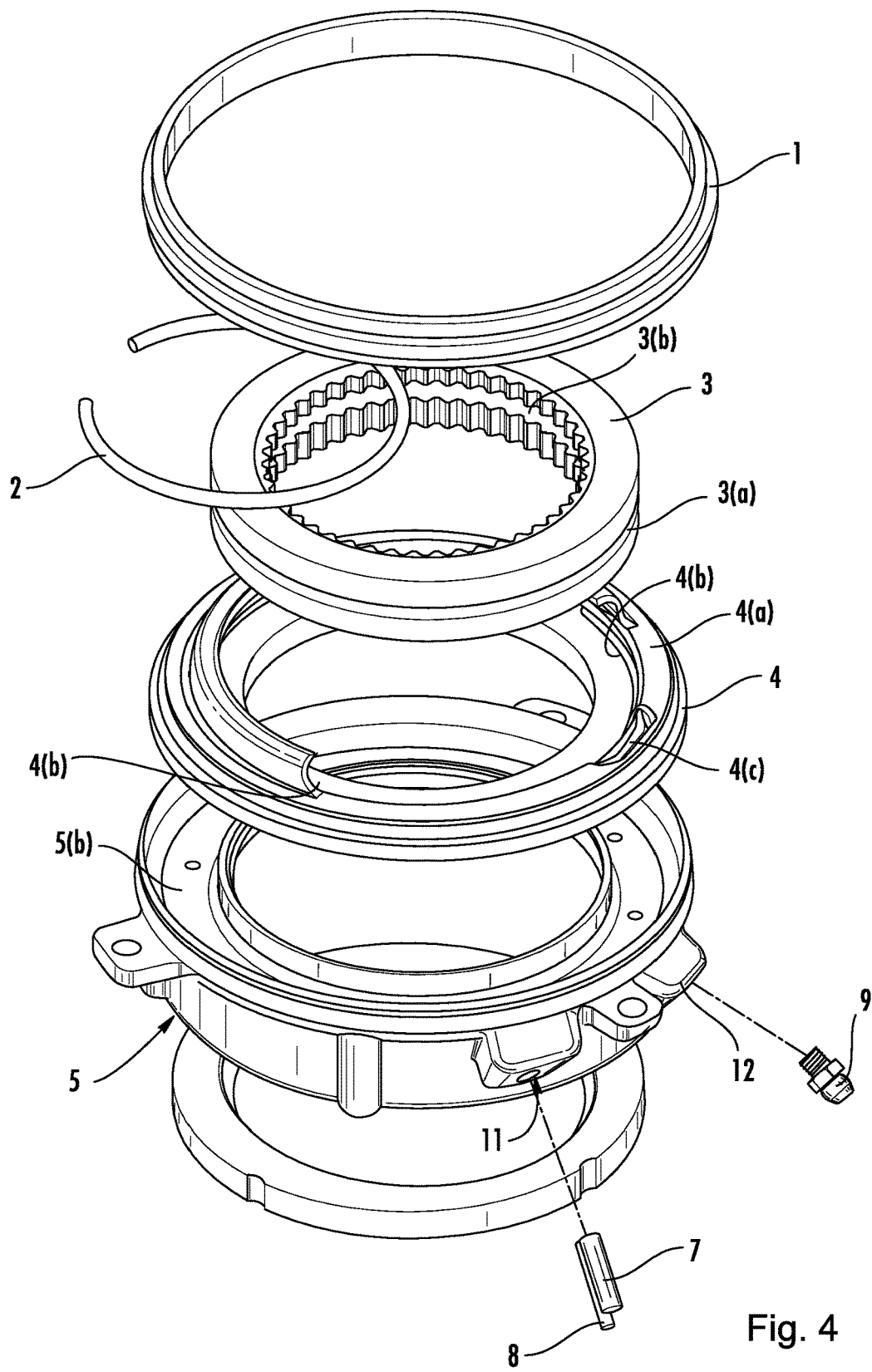
FIG. 4 is an exploded view of the coupler parts.

With reference to FIG. 4, the individual components of the coupler (10) are shown in an exploded view. Since the current device is a replacement part for the OEM actuator, it has the same overall external dimensions and mounts in the vehicle, between the half shaft and wheel hub, in the same manner as a replacement OEM actuator. Likewise, the ring gear splines are dimensioned to mesh with the half-shaft and hub splines. However, there are some differences. The solid pins (7) and (8) in the projection (11) are located to receive and close off the airlines associated with the OEM actuator being replaced. The grease fitting (9) and the projection (12) are new components in the present solution and add the feature that allows the application of grease to the coupled parts.

Still with reference to FIG. 4, the components of the coupler includes an upper seal (1), a snap ring (2) that is inserted in the interior groove (3)(b) of ring gear (3), which also has an external groove (3)(a). The ring gear carrier (4) has an interior channel (4)(b) that is defined by the circumferential projection (4)(a). The circumferential projection (4)(a) fits within the external groove (3)(a) of ring gear (3) and retains the ring gear (3) in ring gear carrier (4) which is press fit to the housing (5). The ring gear carrier (4) has a grease application channel (4)(c), as detailed in FIGS. 5 and 6.

Figure 5:
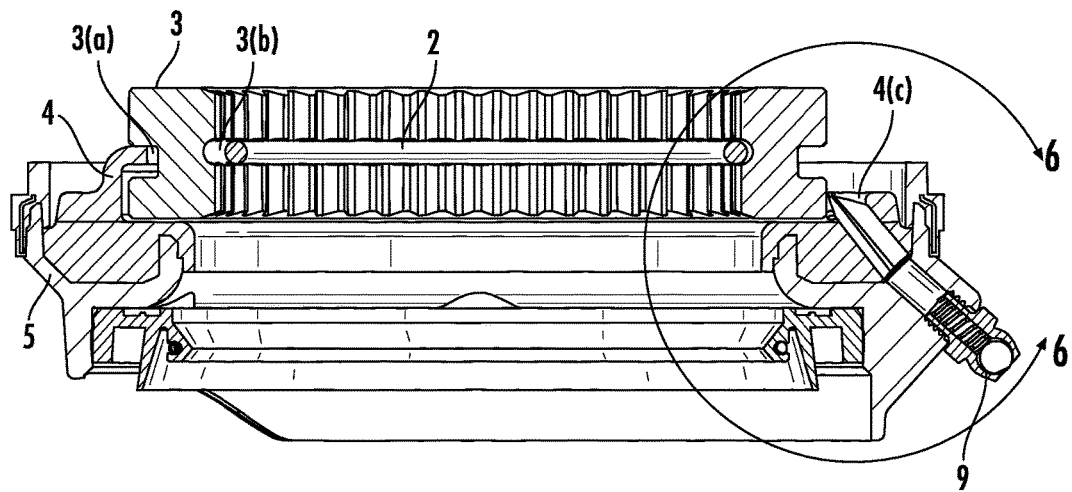
FIG. 5 is a sectional view illustrating the grease fitting and lubrication channel; and, FIG. 6 is an exploded view of the grease fitting and lubrication channel of FIG. 5.
Figure 6:
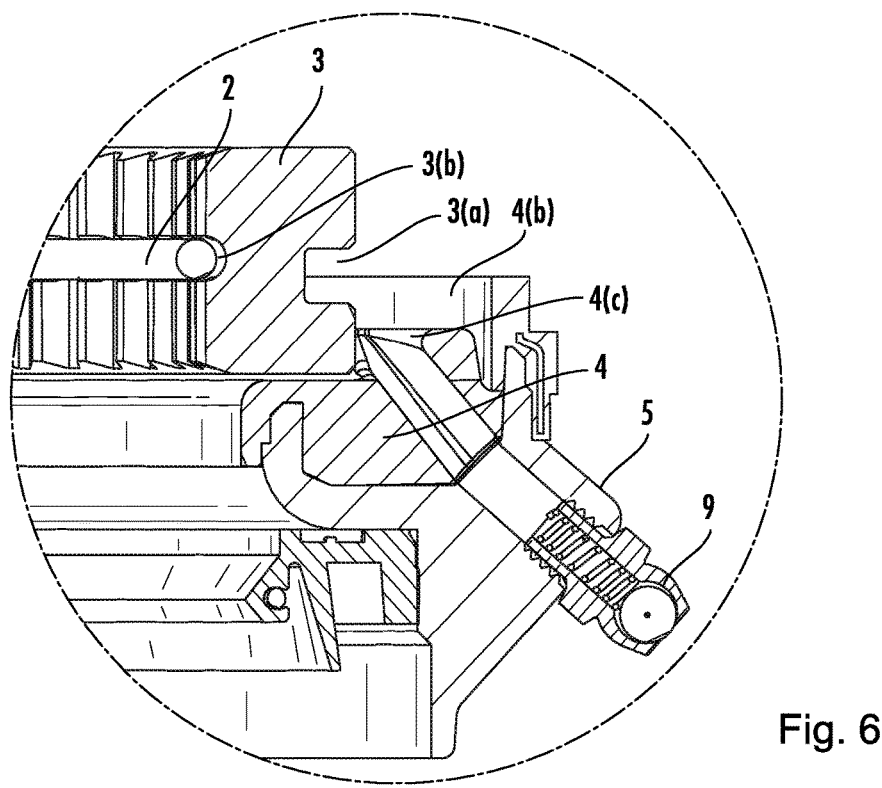

As shown in FIGS. 5 and 6, grease is applied through the grease fitting (9) and into the grease application channel (4)(c). The applied grease flows around the channel (4)(b) and between the ring gear (3) and the ring gear carrier (4) and enters the ring interior to the area of the splines connecting the half shat and hub.

As noted previously, the external dimensions of the coupler mimic the OEM actuator even though the need for a mechanism, vacuum in the OEM part, to engage, disengage and bias the ring gear is eliminated. Due to this simplification, the housing (5) can accommodate a ring gear (3) that is approximately twice the thickness or height of the OEM ring gear, see FIG. 2. This larger ring gear (3) has an interior groove (3)(b) that accepts the snap ring (2), which serves as a mechanical safety lock that prevents the ring gear (3) from deviating away from the engagement zone mating the half-shaft and hub within the coupler (10), see FIG. 4. This maintains the mechanical link between the half-shaft and hub and avoids slippage between them.

What is claimed is:

1. A coupler for connecting a half-shaft and a wheel hub of a vehicle drive train in a continuously engaged condition, the coupler comprising:
   a housing that has
      an interior channel that is configured to receive a ring gear carrier,
      a first projection extending from the housing,
      a first solid pin that has a predetermined dimension and is mounted in the projection to block an airline associated with a vehicle;
   a ring gear that is mounted in the housing, has internal splines dimensioned to mate with splines on a haft-shaft and a wheel hub and has an internal groove that interrupts the internal splines;
   an insert in the internal groove that separates the splines between the half-shaft and the wheel hub, wherein, the ring gear has an axial length that connects a half-shaft and a wheel hub and inhibits axial movement so they are continuously engaged; and
   the ring gear carrier is fixed within the housing and does not move relative to the housing, the ring gear carrier maintains the ring gear in position and prevents axial movement of the ring gear.

2. The coupler of claim 1 wherein the housing and ring gear carrier cooperate to define an internal lubrication channel.

3. The coupler of claim 1 wherein the insert in the internal groove that separates the half-shaft and the wheel hub is a snap ring.

4. The coupler of claim 1 further comprising a second solid pin configured to block an airline, wherein the second solid pin is mounted in the projection of the housing, and wherein the first solid pin and the second solid pin extend radially from the housing.

5. A coupler that connects a constant velocity axle and a wheel hub associated with a steering knuckle, the coupler comprising:
   a housing that mates with a predetermined location on a steering knuckle, has an interior channel that receives a ring gear carrier, and has an internal lubrication channel;
   the ring gear carrier is positioned in the interior channel of the housing such that it does not move relative to the housing, and locates a ring gear for mating with splines on a constant velocity axle and wheel hub, the ring gear carrier further prevents the ring gear from displacement about its longitudinal axis; and
   the ring gear is mounted in the ring gear carrier and has axial splines dimensioned to connect with splines on a constant velocity axle and a wheel hub, the ring gear is axially dimensioned to inhibit axial movement of the ring gear to form a fixed mechanical connection,
   whereby the housing, the ring gear, and the ring gear carrier are fixed relative to each other.

6. The coupler of claim 5 wherein the ring gear splines are internal splines.

7. The coupler of claim 5 wherein the ring gear has a circumferential groove and the ring gear carrier has a circumferential projection that is received within the circumferential groove.

8. The coupler of claim 5 wherein the ring gear has an internal groove dimensioned to receive a snap ring that separates the splines on the ring gear.

9. The coupler of claim 5 wherein the dimension of the splines of the ring gear connects a constant velocity axle and a wheel hub so they are continuously mechanically engaged with each other independent of any driver action during vehicle operation.

10. The coupler of claim 5 wherein the coupler connects a half-shaft and a wheel hub of a vehicle drive train in an engaged condition, the vehicle drive train includes first and second airlines for vacuum power, and,
   the housing further has
      a projection,
      a first solid airline blocking pin mounted in the projection, and
      a second solid pin mounted in the projection, wherein the first solid pin and the second solid pin respectively receive and block terminal ends of the first and second airlines.

11. The coupler of claim 5 wherein the ring is lubricated through the lubrication channel.

12. A vehicle drive train, comprising:
   a wheel hub;

a half-shaft; and
a coupler that maintains the half-shaft and the wheel hub in a continuously engaged condition, the coupler including:
  a housing that has
    an interior channel that is configured to receive a ring gear carrier,
    a first projection extending from the housing, and
    a first solid pin mounted in the projection and to block an airline associated with a vehicle and having a predetermined dimension,
  a ring gear that has internal splines dimensioned to mate with splines on the half-shaft and the wheel hub, and has an internal groove that interrupts the internal splines, and,
  an insert in the internal groove that separates the half-shaft and the wheel hub,
wherein the ring gear has an axial length that connects the half-shaft and the wheel hub; and
the ring gear carrier is fixed within the housing such that it does not move relative to the housing, the ring gear carrier maintains the ring gear in position and inhibits axial movement of the ring gear.

* * * * *